(12) United States Patent  
Huibers et al.

(10) Patent No.: US 7,215,459 B2  
(45) Date of Patent: May 8, 2007

(54) MICROMIRROR DEVICES WITH IN-PLANE DEFORMABLE HINGE

(75) Inventors: Andrew Huibers, Palo Alto, CA (US); Satyadev Patel, Sunnyvale, CA (US); Jonathan Doan, Mountain View, CA (US); James Dunphy, San Jose, CA (US); Dmitri Simonian, Sunnyvale, CA (US); Hongqin Shi, San Jose, CA (US); Jianglong Zhang, Sunnyvale, CA (US)

(73) Assignee: Reflectivity, Inc., Sunnyvale, CA (US)

( * ) Notice: Subject to any disclaimer, the term of this patent is extended or adjusted under 35 U.S.C. 154(b) by 264 days.

(21) Appl. No.: 11/056,732

(22) Filed: Feb. 11, 2005

(65) Prior Publication Data

US 2006/0056006 A1  Mar. 16, 2006

Related U.S. Application Data

(63) Continuation-in-part of application No. 10/927,560, filed on Aug. 25, 2004, now Pat. No. 6,980,349.

(51) Int. Cl.  
*G02B 26/00* (2006.01)

(52) U.S. Cl. .................. 359/291; 359/290; 359/223; 359/224

(58) Field of Classification Search ............ 359/290, 359/291, 292, 295, 220, 222, 223, 224, 230, 359/298, 320, 322  
See application file for complete search history.

(56) References Cited

U.S. PATENT DOCUMENTS

| 5,999,306 | A | 12/1999 | Atobe |
| 6,028,690 | A | 2/2000 | Carter et al. |
| 6,522,454 | B2 | 2/2003 | Meier et al. |
| 6,523,961 | B2 | 2/2003 | Ilkov et al. |
| 6,885,493 | B2* | 4/2005 | Ljungblad et al. ........... 359/290 |
| 7,018,052 | B2* | 3/2006 | Huibers ....................... 353/99 |
| 2002/0024641 | A1 | 2/2002 | Ilkov et al. |
| 2004/0004753 | A1 | 1/2004 | Pan |
| 2004/0214350 | A1 | 10/2004 | Pan et al. |
| 2004/0240033 | A1 | 12/2004 | Pan et al. |

FOREIGN PATENT DOCUMENTS

| WO | WO 2004/000720 | 12/2003 |
| WO | WO 2004/001487 | 12/2003 |
| WO | WO 2004/001717 | 12/2003 |
| WO | WO 2004/109363 | 12/2004 |
| WO | WO 2004/109364 | 12/2004 |

* cited by examiner

*Primary Examiner*—Hung Xuan Dang  
*Assistant Examiner*—Tuyen Tra  
(74) *Attorney, Agent, or Firm*—Gregory R. Muir

(57) ABSTRACT

Disclosed herein is a micromirror device having in-plane deformable hinge to which a deflectable and reflective mirror plate is attached. The mirror plate rotates to different angles in response to an electrostatic field established between the mirror plate and an addressing electrode associated with the mirror plate.

68 Claims, 8 Drawing Sheets

MICROMIRROR DEVICES WITH IN-PLANE DEFORMABLE HINGE

CROSS-REFERENCE TO RELATED PATENT APPLICATIONS

This patent application is a continuation-in-part of U.S. patent application Ser. No. 10/927,560 filed Aug. 25, 2004, now U.S. Pat. No. 6,980,349 the subject matter being incorporated herein by reference.

TECHNICAL FIELD OF THE INVENTION

The present invention is related generally to art of microelectromechanical devices, and, more particularly, to micromirror devices.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

A SLM in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar SLM incorporating a two-dimensional array is described by Hartstein and Peterson, U.S. Pat. No. 4,229,732. Although the switching voltage of this SLM is lowered by connecting the deflectable mirror elements at only one corner, the device has low light efficiency due to the small fractional active area. In addition, diffraction from the addressing circuitry lowers the contrast ratio (modulation depth) of the display. A silicon-based micro-mechanical SLM with a large fractional optically active area is the Digital Mirror Device (DMD), developed by Texas Instruments and described by Hornbeck, U.S. Pat. No. 5,216,537 and other references.

Therefore, what is needed is a spatial light modulator that has a high resolution, a high fill factor, and a high contrast ratio.

SUMMARY OF THE INVENTION

In view of the foregoing, the present invention provides a micromirror device with an in-plane deformable hinge. The objects and advantages of the present invention will be obvious, and in part appear hereafter and are accomplished by the present invention. Such objects of the invention are achieved in the features of the independent claims attached hereto. Preferred embodiments are characterized in the dependent claims.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4b illustrates an exploded cross-section view of a micromirror at an OFF state in the spatial light modulator of FIG. 4a;

FIG. 4c illustrates an exploded cross-section view of a micromirror at an ON state in the spatial light modulator of FIG. 4a;

DETAILED DESCRIPTION OF THE INVENTION

The micromirror device of the present invention comprises a deflectable and reflective mirror plate that is connected to a deformable hinge located in the same plane as the mirror plate. The mirror plate is operable to rotate at a rotation axis that is parallel to but offset from a diagonal of the mirror plate or, is parallel to but offset from an in-plane symmetric axis of the mirror plate. In either configuration, the rotation axis, as well as the deformable hinge may or may not be disposed at an edge of the deflectable and reflective mirror plate.

The deformable hinge is held by a frame having a frame wall. The frame, hinge, and mirror plate is preferably, but not required, fabricated from the same substrate, such as a single crystal. The mirror plate may have a reflective surface coated with a material for efficiently reflecting visible light, particularly, a metallic material with high reflectivity to visible light.

For deflecting the mirror plate with, for example, an electrostatic force derived from an electrostatic field, an addressing electrode in connection with a memory cell is disposed proximate to the mirror plate. Such addressing electrode can be formed on a separate substrate, such as a semiconductor substrate. The distance, which pre-dominantly determines the strength of the electrostatic force applied to the mirror plate with other parameters given, is maintained by the height of the frame wall of the micromirror.

The micromirror device of the present invention can be implemented in many applications, such as display systems, optical switches and other information optical information processing and storing systems. In the following, the present invention will be discussed with reference to micromirror devices for use in display systems. It will be appreciated by those skilled in the art that the following discussion is for demonstration purposes only, and should be interpreted as a limitation. Rather, other variations without departing from the spirit of the invention are also applicable.

Figure 1:
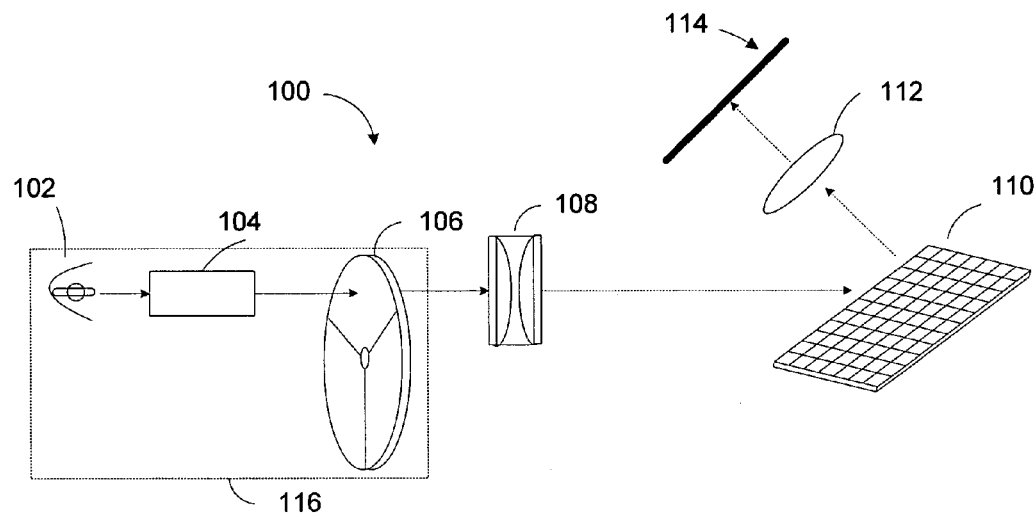
FIG. 1 demonstratively illustrates a display system in which embodiments of the invention can be implemented.

Turning to the drawings, an exemplar micromirror based display system is illustrated in FIG. 1. In its basic configuration, display system 100 comprises illumination system 116 for producing sequential color light, spatial light modulator 110, optical element 108 for directing illumination light from the illumination system onto the spatial light modulator, and optical element 112 that projects the reflected illumination light onto display target 114.

Illumination system 101 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure. More complex display systems are also applicable, especially those having more than one spatial light modulator for color images, such as the display system in FIG. 2.

Figure 2:
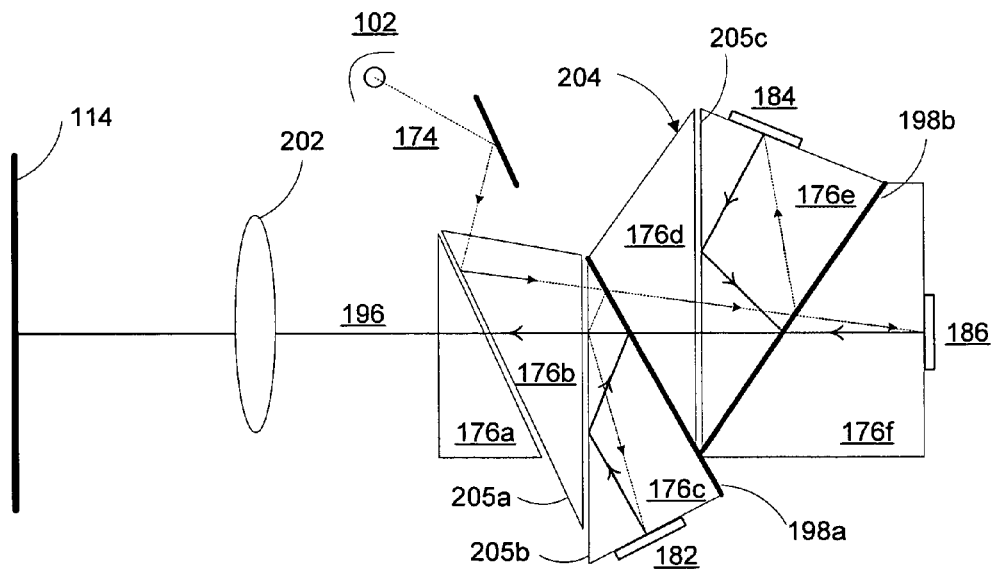
FIG. 2 demonstratively illustrates another display system in which embodiments of the invention can be implemented.

Referring to FIG. 2, another exemplary display system employing three spatial light modulators, each comprising an array of micromirrors and being designated for respectively modulating the multi-color (e.g. three color such as red, green and blue) light beams, is presented therein. The display system employs a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a, 205b, and 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green and blue lights can be properly modulated. The modulated red, green and blue lights are recollected and delivered onto display target 114 through optic elements, such as projection lens 202, if necessary.

The spatial light modulator, in general, comprises an array of hundreds, thousands or millions of micromirrors, the total number of which determines the resolution of the displayed images. For example, the micromirror array of the spatial light modulator may have 1024×768, 1280×720, 1400× 1050, 1600×1200, 1920×1080, or even larger number of micromirrors. In other applications, such as optical switching, the micromirror array may have less number of micromirrors.

Figure 3:
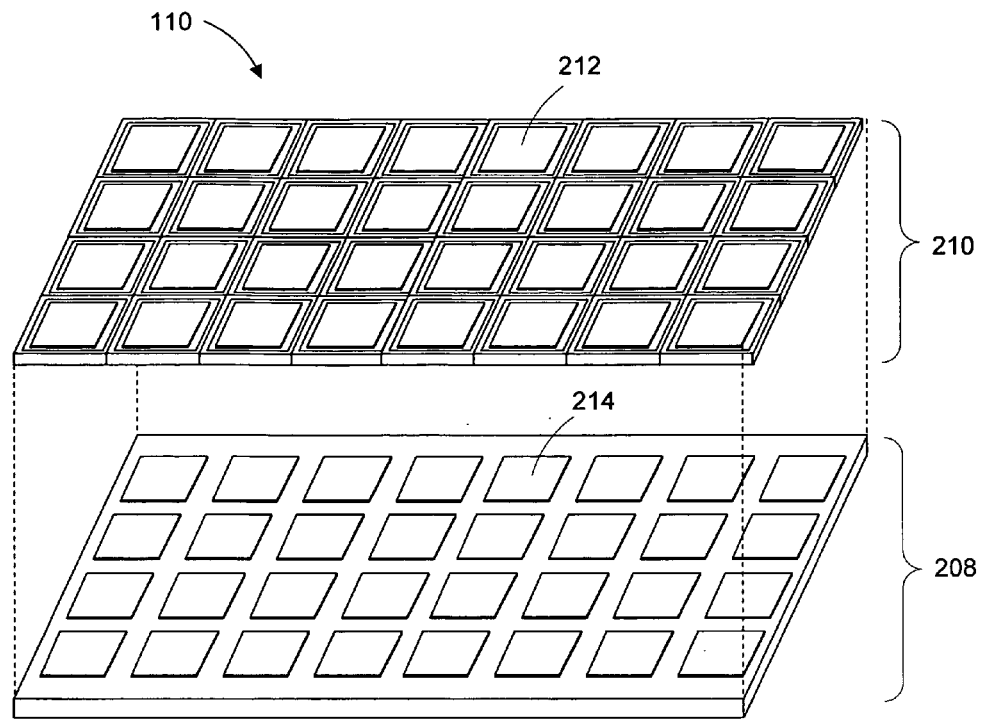
FIG. 3 demonstratively illustrates the spatial light modulator of FIG. 1 or FIG. 2 having a micromirror substrate and an addressing electrode substrate before bonding.

FIG. 3 illustrates a perspective view of the spatial light modulator having micromirror substrate 210 and addressing electrode substrate 208 before being bonded together. The micromirror substrate comprises an array of micromirrors each having a deflectable and reflective mirror plate; and the addressing electrode substrate comprises an array of addressing electrodes each being associated with one mirror plate of the micromirror array for deflecting the mirror plate. For simplicity purposes, only 8×4 micromirrors are presented therein. Formed on the addressing electrode substrate is also an array of circuits, such as memory cells, each having a voltage output node connected to the addressing electrode such that the voltage on the addressing electrode can be controlled according to the voltage signal stored in the memory cell. In accordance with an embodiment of the invention, each mirror plate is associated with one addressing electrode.

For achieving a high resolution and optical efficiency while maintaining the same dimension of the micromirror array so as to be compatible with an arc lamp having a small arc size, such as 1.0 mm or shorter, the micromirror array preferably has certain dimensions as set forth in U.S. patent application Ser. No. 10/627,303 filed Jul. 29, 2003, the subject matter being incorporated herein by reference. For example, the micromirror array preferably has a pitch of 10.16 micrometers or less or from 4.38 to 10.16 micrometers with the pitch defined as the distance between adjacent micromirrors in the micromirror array. The gap between adjacent micromirrors is preferably 0.5 micrometers or less, or from 0.1 to 0.5 micrometer.

Figure 4A:
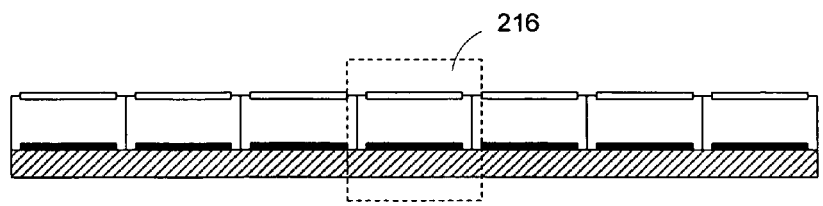
FIG. 4a is a simplified cross-section view of the spatial light modulator in FIG. 1 or FIG. 2.

A cross-section view of the bonded micromirror substrate and addressing electrode substrate is illustrated in FIG. 4a. Referring to FIG. 4a, the bonded micromirror substrate and addressing electrode substrate form an array of micromirror devices, such as micromirror device 216. Each micromirror device (e.g. micromirror device 216) comprises a deflectable and reflective mirror plate and an addressing electrode for deflecting the mirror plate. The mirror plate and the addressing electrode are spaced so as to allow the mirror plate to rotate above the addressing electrode. The distance between the mirror plate and addressing electrode is maintained by a wall of a frame that holding the mirror plate and a deformable hinge to which the mirror plate is connected. The micromirror device of the micromirror array is better illustrated in FIG. 4*b*.

Figure 4B:
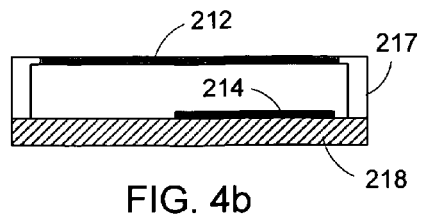

Referring to FIG. 4*b*, an exploded cross-section view of micromirror 216 is illustrated therein. Deflectable and reflective mirror plate 212 is held by a frame with frame wall 217 bonded to substrate 218, on which addressing electrode 214 is formed. The frame wall can be directly bonded to substrate 218 using suitable bonding agents or materials, such as epoxy. Alternatively, the frame wall can be bonded to substrate 218 through a spacer disposed between the frame wall and substrate 218. The height of the frame wall is determined according to the desired electrostatic force for rotating the mirror plate to and ON or OFF state, which will be discussed afterwards in particular examples with reference to FIG. 5.

Figure 4C:
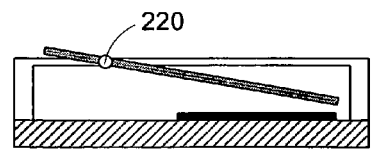

In accordance with one embodiment of the invention, the micromirror is configured such that the mirror plate is operable to rotate asymmetrically—that is, the maximum angle can the mirror plate rotates in one direction is larger than the maximum angle the mirror plate can rotate in the opposite direction, as shown in FIG. 4*c*. Of course, other configurations are applicable. For example, the micromirror can be configured with the hinge formed along a symmetrical axis (e.g. a diagonal) of the mirror plate such that the mirror plate is operable to rotate symmetrically.

Referring to FIG. 4*c*, rotation axis 220 of the mirror plate is located within the same plane of the mirror plate when the mirror plate is not deflected, but offset from the center of the mirror plate. When the mirror plate is deflected, such rotation axis may be slightly displaced off the plane of the mirror plate. The mirror plate can rotate to an ON state angle of 12° degrees or higher, or 14° degrees or higher, or 16° degrees or higher in one direction.

In the above example, each micromirror device has a single addressing electrode for addressing and deflecting the reflective deflectable mirror plate of the micromirror device; and such addressing electrode is positioned within the frame of the micromirror device. Alternatively, more than one electrode can be provided for addressing and deflecting the mirror plate. Specifically, an addressing electrode can be provided for addressing and deflecting the mirror plate to the ON state, and an OFF state electrode for deflecting the mirror plate to the OFF state can be both provided for the same mirror plate of a micromirror device.

For effectively deflecting the mirror plate, the addressing electrode (and/or the OFF state electrode if provided) is preferably positioned offset from the mirror plate. Specifically, a virtual line connecting the geometric center of the addressing electrode and the geometric center of the mirror plate is not perpendicular to the surface of the mirror plate at a non-deflected state. Or such virtual line presents an angle to the surface of the addressing electrode (or the substrate on which the addressing electrode is positioned). The addressing electrode can further be positioned such that the addressing electrode has a portion extending beyond the furthest point of the addressing electrode from its geometric center, as set forth in U.S. patent application "Micromirror Having Offset Addressing Electrode" to Patel, which claims priority from U.S. provisional application Ser. No. 60/582,446 filed on Jun. 23, 2004, the subject matter of each being incorporated herein by reference.

Figure 5:
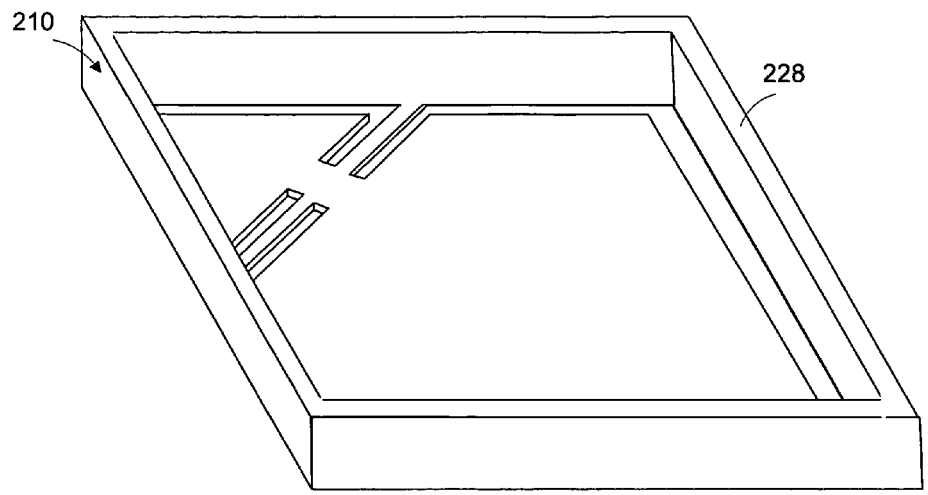
FIG. 5 illustrates a perspective view from the bottom of an exemplary micromirror with in-plane deformable hinge according to an embodiment of the invention.

As a way of example, FIG. 5 illustrates a perspective view from the bottom of the micromirror. The inner portion of mirror substrate 210 is removed, leaving a cavity surrounded by the top surface of the mirror substrate and a frame having frame walls 228. Gaps 227 and 229 are formed on the top surface of the mirror substrate, by which the deflectable and reflective mirror plate (comprising 224 and 226) and deformable hinge 222 are defined, as shown in FIG. 6.

Figure 6:
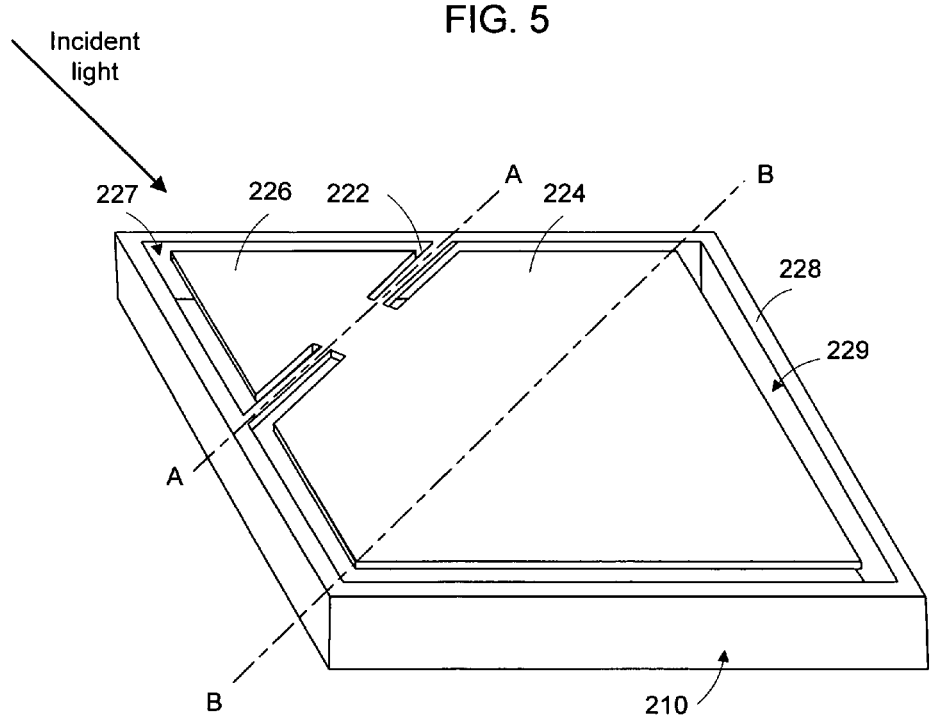
FIG. 6 is a perspective view from the top of the micromirror in FIG. 5.
Figure 7:
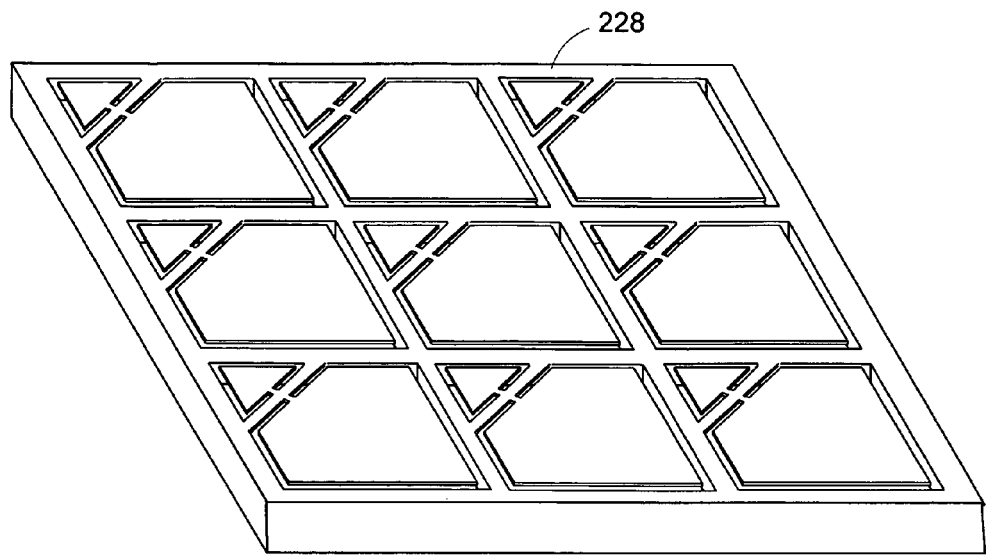
FIG. 7 illustrates a perspective view from the top of an array of micromirrors of FIG. 5.

Referring to FIG. 6, gaps 227 and 229 in combination defines mirror plate, including mirror plate portions 226 and 228, and deformable hinge 222. The profile of the mirror plate is substantially square. Deformable hinge 222 is located in the same plane of the mirror plate when the mirror plate is not deflected and is connected to the portions (226 and 224) of the mirror plate with the length AA of the deformable hinge being parallel to but offset from a diagonal BB of the mirror plate. The deformable hinge is connected to frame wall 228 of the frame and held by such frame.

The height of the frame wall, which may defines the vertical distance between the mirror plate and the addressing electrode for rotating the mirror plate, is determined according to the desired strength of electrostatic force sufficient for rotating the mirror plate to the ON and OFF states. The desired electrostatic force is derived from an electrostatic field established between the mirror plate and the associated addressing electrode. In response to such electrostatic force, the mirror plate rotates above the addressing electrode. Specifically, mirror plate portion 224 rotates towards the substrate (e.g. substrate 208 in FIG. 3) having thee addressing electrode, and mirror plate portion 226 rotates away from the substrate having the addressing electrode. Such rotations are along rotation axis AA defined by deformable hinge 222. During the course of rotation, the hinge deforms and accumulates deformation. Such deformation in turn generates a restoration torque resisting the rotation of the mirror plate. Because the strength of the restoration torque is not sufficient enough to balance the torque of the electrostatic force, the mirror plate continues its rotation to the desire angle, such as the ON state angle.

The rotation of the mirror plate at the desired angle (the ON state angle) can be stopped by stopping mechanisms. The stopping mechanisms can be the addressing electrode substrate (e.g. 208 in FIG. 3) having the addressing electrode or additional stopping structures that can be disposed on the addressing electrode substrate, or on the frames, in particular, the walls of the frame.

As an aspect of the embodiment, the deformable hinge may be thinner (in the direction perpendicular to the mirror plate at non-deflected state) than the mirror plate so as to avoid contact of the hinge side facing the gap between the mirror plate and hinge with the mirror plate side when the mirror plate is deflected before the desired ON state.

When the mirror plate is desired to depart from the ON state for the OFF state, the strength of the applied electrostatic field, thus the strength of the electrostatic force derived thereof, is reduced (e.g. to zero). The restoration force of the deformation torque overcomes the torque of the electrostatic force, resulting in departure of the mirror plate from the OFF state.

A micromirror array having the micromirrors in FIG. 5 is illustrated in 7. For simplicity purposes, only 3×3 micromirrors are presented. The adjacent micromirrors share the same frame wall 228, and frames of the micromirrors form a continuous frame structure.

Figure 8:
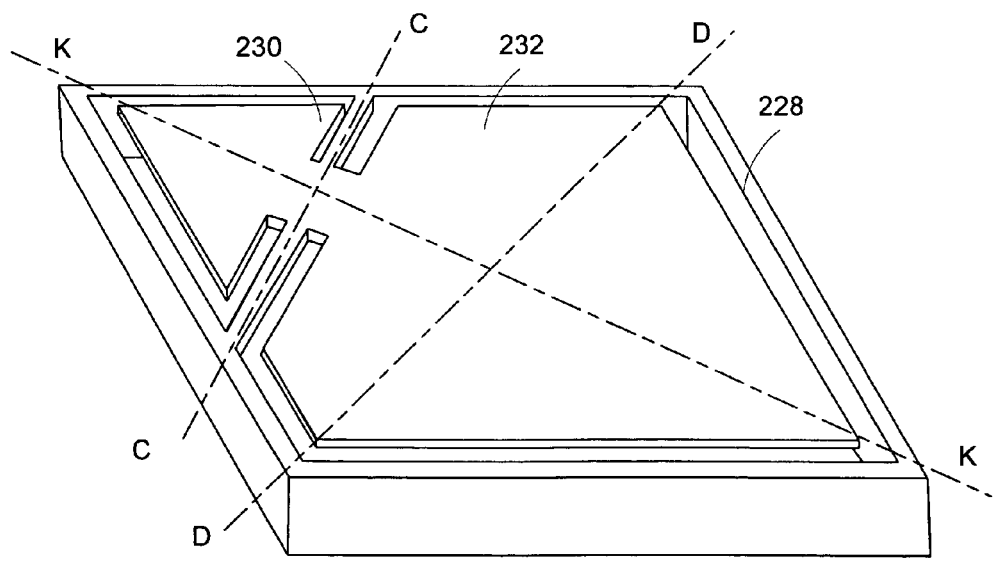
FIG. 8 illustrates a perspective view from the top of another exemplary micromirror with in-plane deformable hinge according to an embodiment of the invention.

Another exemplary micromirror according to an embodiment of the invention is illustrated in FIG. 8. Unlike the micromirror in FIG. 5, the micromirror in FIG. 8 has deformable hinge 230 whose length is along direction CC that is offset from and not parallel to diagonal DD or diagonal KK of the mirror plate. Instead, the angle between CC and DD can be a non-zero angle and preferably within ±20° degrees, or within ±10° degrees, or within ±5° degrees. The angle between CC and KK can be within ±85° degrees, or ±80° degrees, or ±70° degrees. The angle between CC and the edge of the mirror plate is from 35° to 55° degrees. The deformable hinge is affixed to frame wall 28 of the frame. Mirror plate 232 is connected to the deformable hinge in a way such that: a) the mirror plate and the hinge are in the same plane when the mirror plate is not deflected; and b) in response to an electrostatic force derived from the electrostatic field established between the mirror plate and an addressing electrode, a portion of the mirror plate rotates towards the substrate having the addressing electrode, while the opposite portion of the mirror plate rotates away from the substrate having the addressing electrode.

Figure 9:
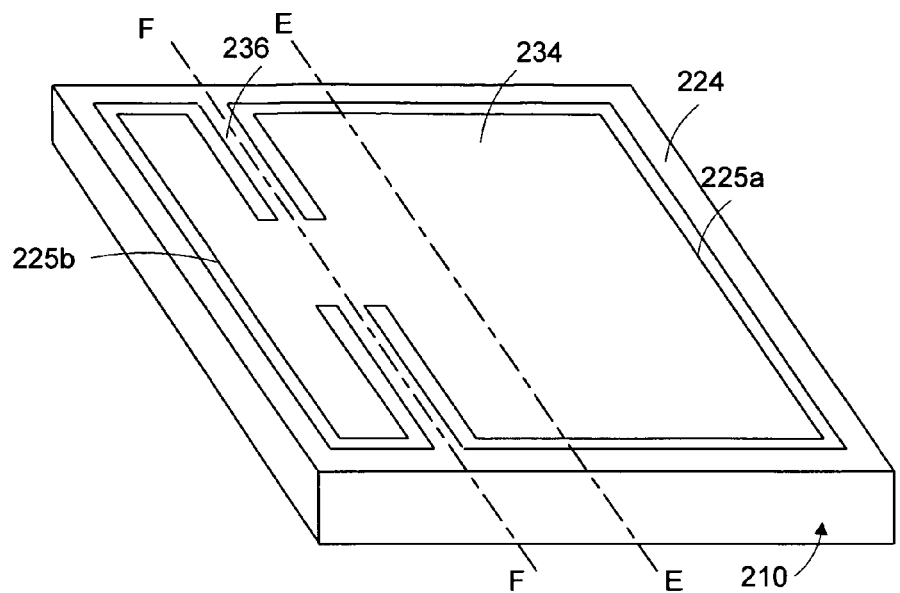
FIG. 9 illustrates a perspective view from the top of yet another exemplary micromirror with in-plane deformable hinge in accordance with another embodiment of the invention.

The deformable hinge can also be defined with the length of the deformable hinge along an edge of the mirror plate, as show in FIG. 9. Referring to FIG. 9, mirror plate 234 and deformable hinge 236 is defined in the top surface of mirror substrate 210. The mirror plate is substantially square with the in-plane symmetrical axis represented by dashed line EE. The symmetrical axis equally separate the surface of the mirror plate, that is, the two opposite edges 225a and 225b of the mirror plate are equally spaced apart from symmetrical axis EE. For enabling asymmetrical rotation of the mirror plate, thereby improving the contrast ratio of the display system, rotation axis FF of the mirror plate is made parallel to but offset from the symmetrical axis EE of the mirror plate by disposing the deformable hinge whose length is along a direction parallel to but offset from the symmetrical axis EE. When an electrostatic force derived from an electrostatic field established between the mirror plate and the associated addressing electrode, the mirror plate rotates above the addressing electrode substrate having the addressing electrode. Specifically, a portion of the mirror plate rotates towards the addressing electrode substrate, while the opposite portion of the mirror plate rotate away from the addressing electrode substrate.

For providing a space between the mirror plate and addressing electrode in which the mirror plate can rotate, the mirror plate is connected to the deformable hinge that is affixed to frame wall 224 of the frame. The frame wall separates the addressing electrode and mirror plate and defines the distance therebetween according to desired strength of the electrostatic force sufficient for rotating the mirror plate to the desired angles, such as the ON or OFF state angles.

In accordance with yet another embodiment of the invention, the deformable hinge as shown in FIG. 9 can be made with the length along a direction offset from the symmetrical axis EE but having a non-zero angle therebetween. The angle can be 20° or less, such as 15° or less, or 10° degrees or less, or 5° degrees or less.

In operation, illumination light is directed to the mirror plate and reflected thereby. In order to prevent or reduce unexpected light scattering of the illumination light from the edges of the mirror plate, it is advantageous to direct the illumination light not perpendicularly to the edges of the mirror plate. Instead, the illumination can be directed to the mirror plate along a diagonal of the mirror plate as shown in FIG. 6. For the same reason, if the mirror plate comprises gaps exposed to the illumination light, the edges of the gaps are preferably formed not perpendicular to the illumination light, as illustrated in FIG. 10.

Figure 10:
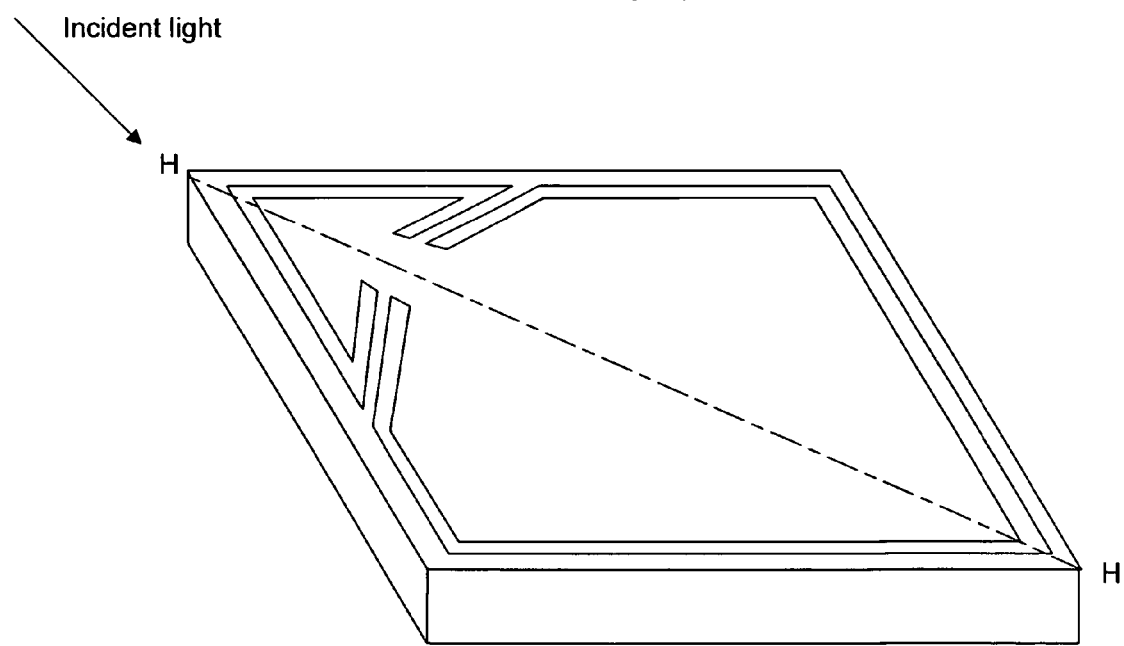
FIG. 10 illustrates a perspective view from the top of yet another exemplary micromirror with in-plane deformable hinge in accordance with another embodiment of the invention.

Referring to FIG. 10, two pairs of gaps in the reflective mirror plate together define a deformable hinge that is within the same plane of the mirror plate such that the mirror plate can rotate along a rotation axis. The defined deformable hinge can be parallel to but offset from a diagonal of the mirror plate as illustrated in the figure. Alternatively, the defined deformable hinge can be offset and not parallel to any diagonal of the mirror plate. The gaps are formed such that the lengths of the gaps are not perpendicular to the illumination light. The lengths of the gaps are not perpendicular to the diagonal (e.g. diagonal HH) of the mirror plate, the diagonal along which the illumination light is directed to the mirror plate.

The undesired light scattering from the exposed gaps in the mirror plate can be further reduced by properly reducing dimensions (e.g. the widths) of the exposed gaps. In this instance, the dimensions of the exposed gaps preferably do not match (e.g. larger than) the wavelength of the incident light. This arises from the fact that, if the dimensions of the exposed gaps match (e.g. equal or are less than) the wavelength of the illumination light, unexpected diffraction pattern may be produced by the exposed gaps. Such diffraction pattern will be superpositioned with the desired image on the display target, thereby distorting the displayed desired image.

Figure 11:
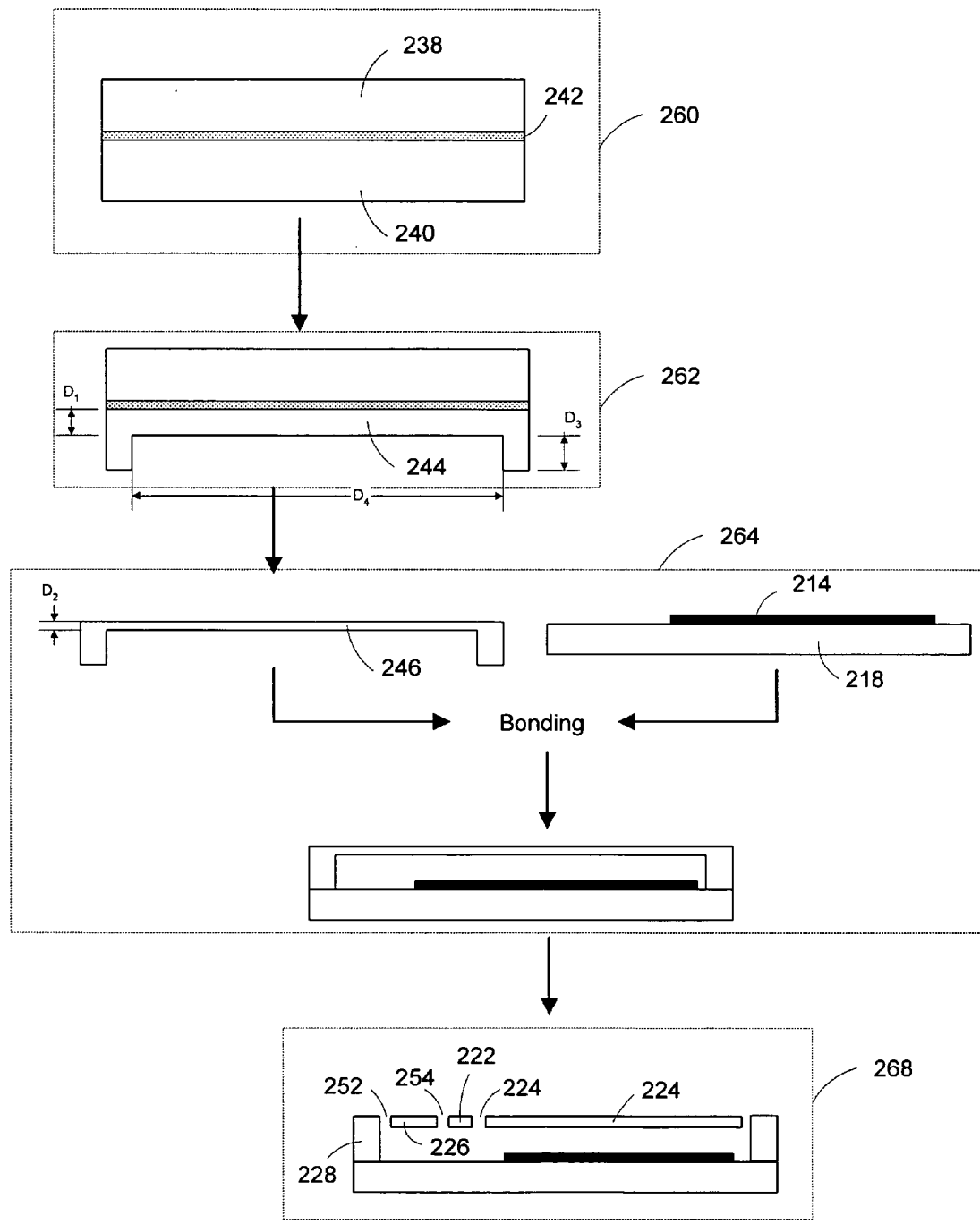
FIG. 11 is a flow chart of an exemplary fabrication process for making the micromirror according to the invention.

The micromirror device as discussed above can be fabricated in many ways. As a way of example, FIG. 11 illustrates a flow chart having steps executed for making the micromirror device. Referring to FIG. 11, mirror substrate 240 is provided (step 260). Because the reflective deflectable mirror plate and the deformable hinge of the micromirror will be fabricated from such mirror substrate, such mirror plate is desired to be rigid and have low creep rate. The mirror substrate can be a single crystal silicon substrate.

For securely handling the mirror plate during the fabrication, handling substrate 238 is provided and attached to the mirror substrate. The handling substrate will be removed later at step 264, for example, using physical techniques, such as grinding and polishing, or chemical techniques, such as etching, or a combination thereof. The chemical etching method can be any suitable etching method as long as the mirror substrate will not be damaged, such as energized etching (e.g. plasma, ion etching, wet or dry etching) or non-energized etching (e.g. etching with spontaneous etchants) depending upon the material of the handling substrate.

For simplifying the following removal of the handling substrate, protection layer 242 is disposed between the mirror substrate and handling substrate by depositing the protection layer before forming the handling substrate on the mirror substrate. The protection layer can be composed of an oxide material, such as silicon oxide, or other suitable materials, such as nitrides (e.g. $TiN_x$, and $SiN_x$).

The mirror substrate is then patterned so as to create a cavity in the bottom surface of the mirror substrate, as shown in step 262. Standard techniques, such as photolithography followed by an etching process such as a plasma etching (e.g. reactive-ion-etching) can be used to form such cavity. The cavity leaves a frame having a frame wall (e.g. frame wall 228 in FIG. 3) with a height $D_3$. The height, which defines the distance between the mirror plate and the associated addressing electrode when the frame wall is directly bonded to the substrate, is determined according to the desired strength of the electrostatic force. When the frame wall is bonded to the substrate via a spacer disposed therebetween, the height of the spacer is included in determining the height of the frame wall for the given strength of the electrostatic force. In accordance with an embodiment of the invention, the frame wall has a height $D_3$ of 6 microns or less, such as 5 microns or less, or 4.5 microns or less, or 3.5 microns or less. The length of the cavity $D_4$ is made according to the desired size of the mirror plate and the cross-dimension of the gaps (e.g. gaps 227 and 228 in FIG. 3). Exemplary length of $D_4$ can be approximately 14 microns or less, such as 13.8 microns or less, or 13 microns or less. Alternatively, length $D_4$ can be determined according to the desired geometric dimensions of the micromirror array, such as the pitch size (which can be 10.16 micrometers or less or from 4.38 to 10.16 micrometers) and the gap size between adjacent mirrors (which can be 0.5 micrometers or less, or from 0.1 to 0.5 micrometers) as discussed earlier.

After the formation of the cavity, handling substrate 238 and protection layer 242 are removed using a suitable method. The top surface of the mirror substrate is then thinned so as to form the deflectable and reflective mirror plate and deformable hinge (step 246). This surface thinning step can be performed by etching, and more preferably by grinding or polishing to obtain an even top surface. The resulted top surface has a thickness $D_2$, which is smaller than the thickness $D_1$ of the top surface as show in step 262, and is the desired thickness of the mirror plate. As a way of example, $D_1$ can be from 0.1 to 0.45 microns, such as from 0.2 to 0.35 microns, or around 0.25 microns.

The thinned mirror substrate 246 with cavity formed therein is then bonded to addressing electrode substrate 218 having addressing electrode 214 and circuitry (not shown for simplicity) thereon (step 264) to form an assembly using preferably a low temperature bonding technique, such as eutectic bonding, as set forth U.S. patent application Ser. No. 10/869,539, filed Jun. 15, 2004, wherein a low temperature bonding method is employed to bond two substrates respectively having micromirrors and addressing electrodes thereon, the subject matter being incorporated herein by reference. In performing the bonding, the two substrates may be required to be aligned together. Such alignment can be performed in the aid of holes made in the substrates. For example, a hole through one or both of the silicon substrates can be made with deep silicon etch (e.g. STS deep silicon etch tool). The two substrates are then optically aligned via the hole.

The thinned mirror substrate and addressing electrode substrate can also be bonded using other bonding methods adopted from methods for bonding two substrates having micromirrors and addressing electrodes, as set forth in U.S. patent application Ser. No. 10/852,981 filed May 24, 2004, the subject matter being incorporated herein by reference.

The top surface of the mirror substrate in the bonded assembly is then patterned to form the deformable hinge and mirror plate (step 268) using for example, standard lithography technique followed by an etching process, such as a plasma etching (e.g. a reactive-ion-etching). Specifically, gaps 252, 254, and 224 are made according to the desired pattern, such as the gaps in FIGS. 5, 8, and 9. The gaps results in a deformable hinge 222 and the mirror plate (including mirror plate portions 224 and 226) held by frame wall 228.

Figure 12:
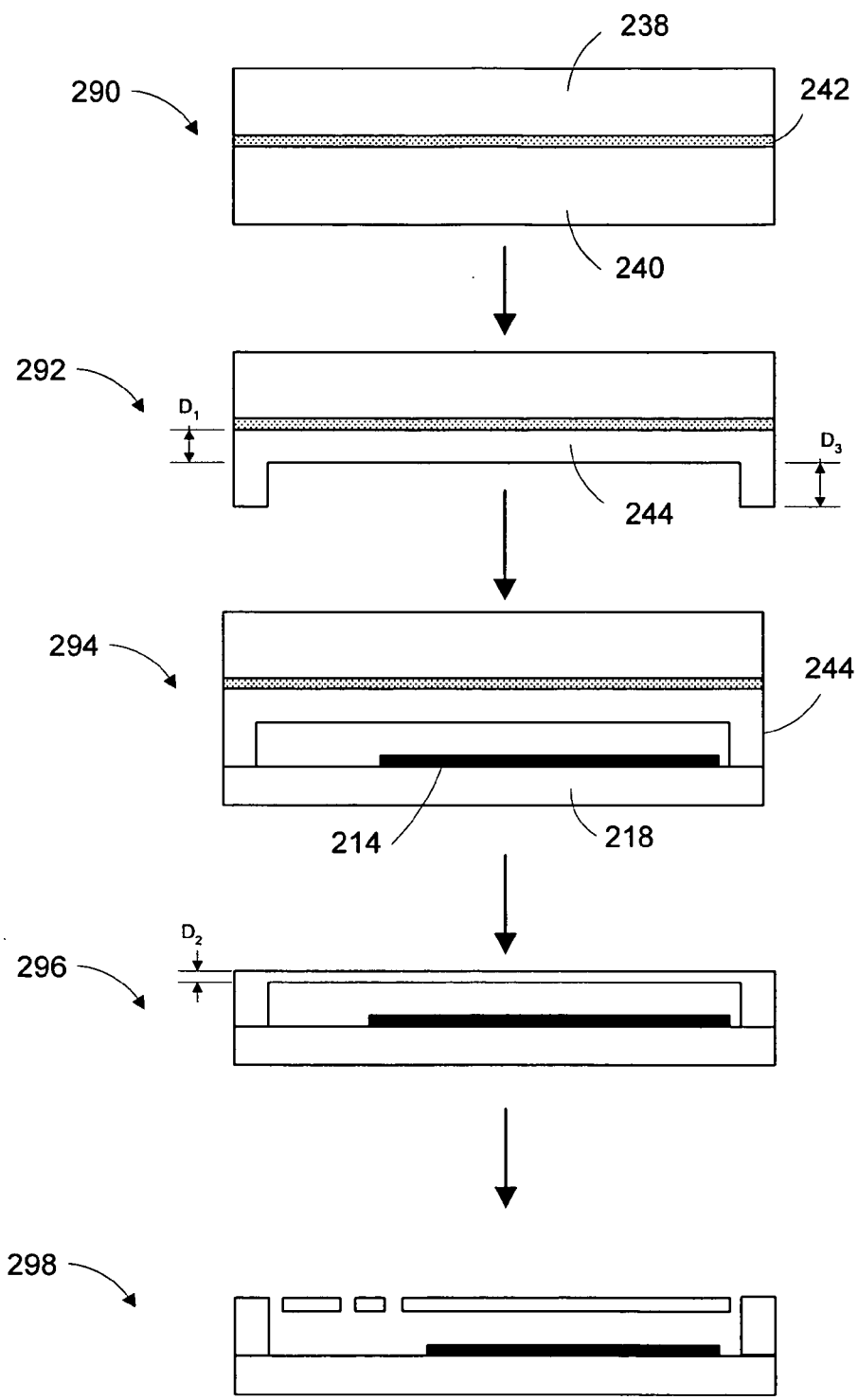
FIG. 12 is another flow chart of another exemplary fabrication process for making the micromirror according to the invention.

Alternative to the fabrication process discussed above wherein the handling substrate (substrate 238) is removed before bonding the thinned mirror substrate to the electrode substrate, the handling substrate can be removed after bonding the mirror plate to the electrode substrate, as illustrated in FIG. 12.

Referring to FIG. 12, handing substrate 238 is bonded to mirror substrate 240 with protection layer 242 disposed in between at step 290. The mirror substrate is then formed therein a cavity at step 292. At step 294, the mirror substrate having the cavity and bonded to handling substrate 238 is bonded to electrode substrate 218 having addressing electrode 214 formed thereon. After bonding, handling substrate 238 and protection layer 242 are removed from the mirror substrate followed by the thinning process of the mirror substrate at step 296. The thinned mirror substrate is then patterned so as to form the desired mirror plate and deformable hinge.

For improving the performance and reliability of the micromirror device, other techniques may be employed during the fabrication. For example, the top surface (after thinning) of the mirror substrate (e.g. mirror substrate 246) can be coated with a reflective material, such as aluminum, gold, and silver. When the aluminum layer is to be formed on the thinned top surface of the mirror substrate, the aluminum layer can be formed by sputtering using an Al—Si sputtering target so as to avoid possible diffusion between the deposited aluminum layer on the silicon mirror plate and the silicon mirror plate. The coating can be performed at any step after thinning the top surface of the mirror substrate. Alternatively, a barrier layer can be deposited before depositing the aluminum layer on the reflective surface of the mirror plate to prevent diffusion between aluminum and silicon. Such barrier layer can be $TiN_x$, $SiO_x$, and $SiN_x$, etc.

When an aluminum layer is deposited on the reflecting surface of the mirror plate, the mirror plate may be curved due to the deposited aluminum layer. To stop such curving, another aluminum layer, or a layer of a suitable material having suitable mechanical properties, is deposited on the bottom surface (the opposite surface to the reflecting surface) of the mirror plate to balance the deformation of the aluminum layer on the reflecting surface of the mirror plate. Such additional balancing layer can be deposited as a trip, frame, or grid, or completely covers the underside of the mirror plate.

The deformable hinge can also be further processed to improve its reliability and performance. For example, either one or both of the top and bottom surfaces of the deformable hinge can be coated with a layer of $SiN_x$, $TiN_x$, $TiSiN_x$, or $SiO$ to improve its mechanical property. The hinge can also be doped with selected materials, such as boron to improve its mechanical property. The hinge may further have a protection layer deposited thereon for preventing oxidation. Other treatment methods, such as pre-oxidation and pre-straining can be performed for the deformable hinge, as set forth in U.S. patent application Ser. No. 10/766,776, filed Jan. 27, 2004, and Ser. No. 10/823,823 filed Apr. 13, 2004, the subject matter of each being incorporated herein by reference.

For limiting the rotation of the mirror plate when it reaches desired angles (e.g. the ON state angle and OFF state angle), a stopper may be provided. The stopper can be formed on the addressing electrode substrate having addressing electrodes formed thereon, for example, beside the addressing electrode. The stopper can also be formed on the frame holding the mirror plate and hinge. In any situation, the stopper has a contacting surface that contacts the surface of the mirror plate. Such contact may result in stiction when the restoration force in the deformed hinge cannot overcome the adhesion force in presence of the contacting surfaces. In order to prevent such in-use stiction, the micromirror device, especially the contact area, can be lubricated with a lubricant material that coats or physically reacts with the surface molecules of the contact area, as set forth in U.S. patent application Ser. No. 10/810,076, filed Mar. 26, 2003, the subject matter being incorporated herein by reference.

In accordance with the invention, the lubricant can be liquid (or paste) or solid. The lubricant may have a high boiling point (e.g. 100° C. or higher) or low vapor pressure such that the lubricant does not condense at low temperature or fully evaporate at high temperatures (e.g. 30° C. or more or 70° C. or more, or even 100° C. or more) (the high and temperature refer to the storage and operating range of the micromirror device). The lubricant is desired to be stable at a high temperature, such as 200° C. or higher. The viscosity of the lubricant in liquid phase can be of from 1 cP to 5000 cP. However, any desired lubricant can be used.

As an example, the lubricant can be a perfluoropolyether with molecular weight of from 500 to 5000. The lubricant can also be a perfluorinated hydrocarbon having 30 carbons or less, such as an alkane, an amine, an alcohol, an ether, atriazine, or a glycols. Other suitable lubricants are also applicable. The lubricant may be mixed with other materials, such as a diluent to form a lubricant solution. The diluent is preferably chemically stable at a temperature of 200° C. or higher. An exemplary diluent is a perfluorinated hydrocarbon having 20 carbons or less.

The spatial light modulator may be operated in an environment having unexpected gases, moisture or particles (e.g. due to package leaks) which may degrade the performance of the spatial light modulator or cause device failure. This problem can be solved by providing a getter (or getters) to the spatial light modulator for absorbing the gases, moisture, and/or the particles in the environment in which the micromirrors of the spatial light modulator are operated.

The lubricant (or the lubricant solution) for lubricating the surfaces of the micromirrors and the getter(s) for absorbing the gases, moisture, and particles can be disposed at any desired location in the spatial light modulator. As an example of the invention, the lubricant and the getter are disposed on the substrate on which the deflectable elements (e.g. the micromirrors of the spatial light modulator) of the micromirrors are formed; and the lubricant material can be disposed on either or both sides of the mirror substrate. The getter material can be deposited on the substrate on which the mirror plates are formed in the same way as the lubricant. Selected getter material (e.g. if in black color) may also be employed for absorbing scattered light from the edges of the micromirror device, in which situation the getter material can be disposed around the periphery of the micromirror or micromirror array.

Because the mirror plate comprises gaps made for defining the deformable hinge in the mirror plate, the gaps is exposed to the illumination light. In operation, the illumination light can travel through the gaps and illuminates the components of the micromirror, such as the surface of the electrode substrate, the electrode, the internal surface of the frame wall, and the top surface of the frame wall, causing unexpected light scattering. This problem can be solved by providing a light absorbing/blocking material to the micromirror, as illustrated in FIG. 13.

Figure 13:
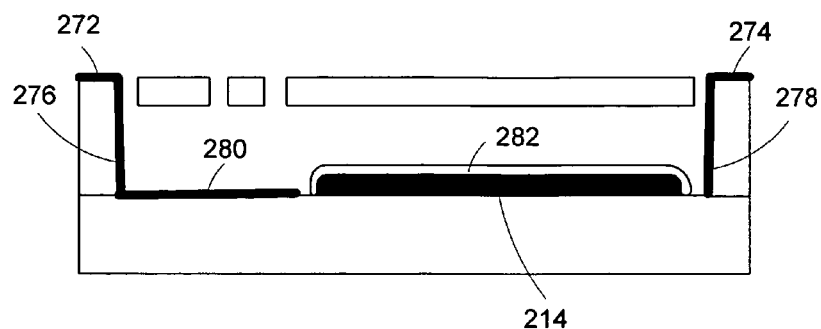
FIG. 13 is an exploded view of FIG. 12, wherein the micromirror device comprises light absorbing/blocking materials.

Referring to FIG. 13, light blocking/absorbing layer 272 can be deposited on the top surface of the frame wall that is exposed to the illumination light. Light absorbing layers 276 and 278 can be deposited on the internal surface of the frame wall so as to absorb illumination light incident thereon. Alternatively, light absorbing layer 280 can be deposited on the areas of the electrode substrate surface not covered by the addressing electrode (addressing electrode 214). For the purpose of preventing or reducing the light scattering from the addressing electrode, the addressing electrode can be coated with light absorbing layer 282.

The light absorbing/blocking layers may comprise any suitable materials. In an embodiment of the invention, the light blocking/absorbing layers are operable to block (or absorb) many wavelengths in the visible spectrum, and are thermal stable. It is preferred that the light blocking (or absorbing) material is capable of blocking (or absorbing) 83% or more, such as 90% or more, 95% or more, and 99% or more of the light incident thereto. For example, the light blocking layer (e.g. layer 272 in FIG. 13) can be ion beam sputtered black chrome or niobium that has a reflectance as low as 3% through the light transmissive substrate. The black chrome coating can be a multilayer structure of chrome and chromium oxide (to match the index of refraction, as in an antireflective coating multilayer film). Of course, other opaque films (preferably those with high optical density, thermally stable and with low reflectivity) can be deposited and patterned (the opacity and color of many films being variable due to deposition parameters).

The light absorbing materials can be black nickel, CrN, TiAlN, TaN, and many films comprising carbon, such as amorphous CN, amorphous CAlN, TiC, TiCN, a-DLC, vitreous carbon, SiC, TiAlCN, WC, etc. Multilayer structures, such as TiC/WC, WC/C or TiAlN/WC/C, can also be used, as well as other multilayer structures with matched indices. Also polyimides and other polymers containing carbon black (or other opacity increasing material) can be used.

When a light absorbing layer (e.g. layer 282 in FIG. 13) is to be coated on the addressing electrode, such layer is preferably non-conductive, such as polyimide with carbon particles (e.g. DARC ™ from Brewer Science). Or other dark colored ceramic films such as CrNx, CrOx, TiAlN, TaNx or other films comprising of carbon, such as amorphous CN, amorphous CAlN, TiCN, a-DLC, SiC, TiAlCN, WC, etc. In the alternative, conductive dark films could be used that are placed directly over the addressing electrodes and are electrically connected to the addressing electrodes. Such a film could be a dark metal or metal alloy such as sputtered black chrome or niobium that has a reflectance as low as 3%. The black chrome coating can be a multilayer structure of chrome and chromium oxide (to match the index of refraction, as in an antireflective coating multilayer film). Of course, other opaque films (preferably those with high optical density, thermally stable and with low reflectivity) can be deposited and patterned (the opacity and color of many films being variable due to deposition parameters). Light absorbing conductive materials that can be deposited on the electrodes include black nickel, and films comprising carbon, such as a-DLC or vitreous carbon. It is also possible to deposit a dark electrically conductive grid or matrix surrounding all of the electrodes (without electrically connecting the electrodes).

The light absorbing/blocking layers can be deposited by any suitable film forming methods—such as standard deposition and patterning techniques. For example, the metals and metal alloys can be deposited by sputtering a target in an inert atmosphere. Other techniques, such as electroplating can be used. For ceramic materials, a target can be reactively sputtered—such as in a nitrogen atmosphere to form nitride ceramic films. Or, some films can be deposited by chemical vapor deposition as known in the art. Patterning of the films to form matrices, bands, strips or other designs can be by any suitable etching chemistry—such as by a chlorine (plasma) etch after deposition and patterning of a photoresist. It is also possible to deposit and pattern a photoresist followed by deposition of the light absorbing material.

In addition, the exposed areas of the micromirror device which are not designated for reflecting the incident light are also preferably coated with the light absorbing material as discussed above. For example, the surface exposed to the incident light can be coated with the light absorbing material.

In addition to the light absorbing/blocking layers, an "anti-reflective coating" (an AR film) can also be deposited on the on the electrode substrate, the internal surface of the frame wall, the addressing electrode, the exposed top surface of the frame wall and any other exposed areas other than the reflective surface of the mirror plate in the micromirror. For example a normally absorptive surface (coated with a light absorbing/blocking material) can have enhanced absorption if an "AR film" stack (for example light transmissive dielectric layers), are placed above it so that light reflection is reduced due to destructive interference. Such dielectrics layers can be designed to work particularly well at certain wavelengths and/or angles—and can be used for the matrix or frame on the light transmissive substrate, as will be discussed below.

The light blocking/absorbing layers as discussed above can also be applied to a micromirror array having an array of micromirrors described above, as shown in FIG. 14.

Figure 14:
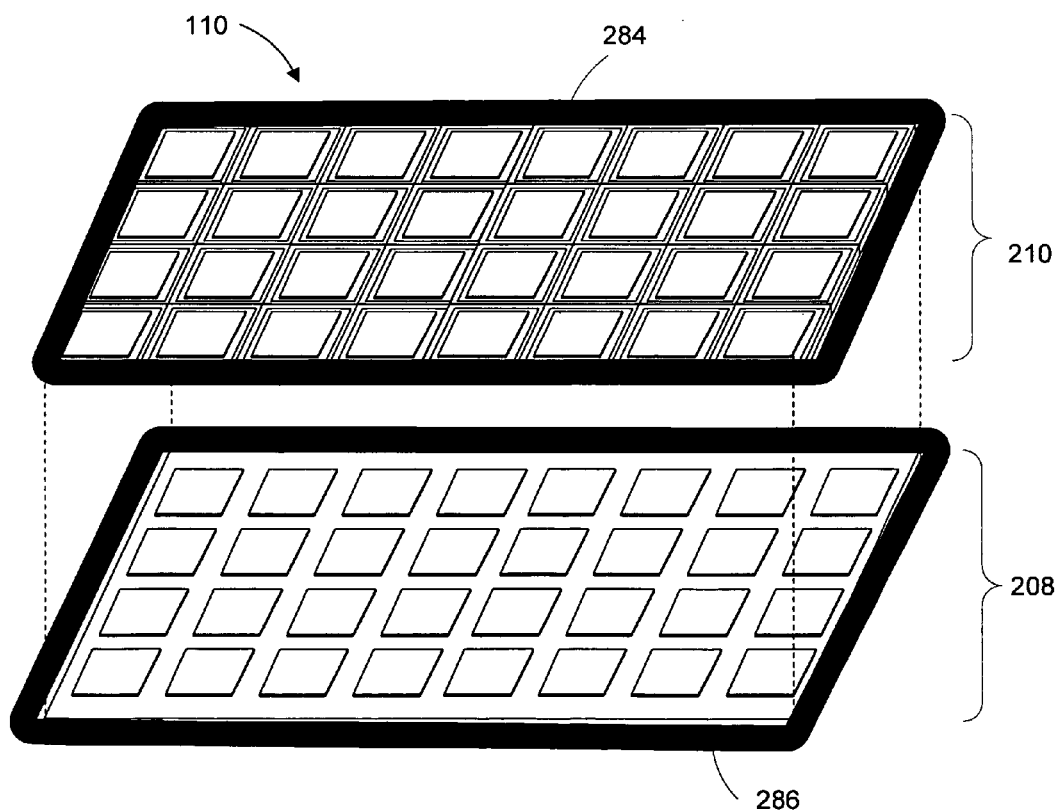
FIG. 14 demonstratively illustrates light blocking/absorbing frames formed on the mirror substrate or the electrode substrate or both.

Referring to FIG. 14, light blocking/absorbing layer 284 is deposited around the perimeter of mirror substrate 210 having an array of micromirrors. Alternatively, light absorbing/blocking layer 286 can be deposited around the perimeter of electrode substrate 208. Of course, the light absorbing/blocking layers 284 and 286 can be applied individually or in combination. The light absorbing/blocking layers 284 and 286 can alternatively be formed in other suitable forms other than a frame. For example, they can be formed as a grid such that the micromirrors (and/or the addressing electrodes) are located in the nets of the grid and surrounded by the light absorbing/blocking material. The light blocking/absorbing layers can also be formed as strips, segments, and any combination with frames and grids.

It will be appreciated by those skilled in the art that a micromirror device and a method of making the same have been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

The invention claimed is:

1. A spatial light modulation device, comprising:
    an army of micromirror devices, each of which comprises:
        a single crystal mirror plate;
        a deformable hinge in the same plane of the mirror plate, wherein the hinge extends along a direction that is offset from said diagonal of the mirror plate, and is not parallel to any major sides of the mirror plate; and
        one addressing electrode proximate to the mirror plate for deflecting the mirror plate.

2. The device of claim 1, wherein the single crystal is single crystal silicon.

3. The device of claim 2, wherein the mirror plate is substantially square having four major sides; and wherein said diagonal is one of the two major diagonals each connecting two opposite corners of the square.

4. The device of claim 3, wherein the length of the hinge has an angle with said diagonal, said angle is from +20° to −20° degrees.

5. The device of claim 3, wherein the length of the hinge has an angle with said diagonal, said angle is from +5° to −5° degrees.

6. The device of claim 3, wherein the length of the hinge has an angle with a major side of the mirror plate, said angle is from +35° to 55° degrees.

7. The device of claim 2, wherein the deformable hinge is single crystal.

8. The device of claim 7, wherein the deformable hinge and the mirror plate are derived from the same single crystal.

9. The device of claim 8, wherein the mirror plate is held by a frame that comprises a frame wall, said frame wall being bonded to a silicon substrate having the addressing electrode formed thereon, such that the mirror plate is held above and spaced apart from the addressing electrode by the frame.

10. The device of claim 9, wherein the frame is derived from the same single crystal of the mirror plate and the deformable hinge.

11. The device of claim 2, wherein the mirror plate comprises a reflecting surface that comprises a reflective material that is aluminum, gold, and silver.

12. The device of claim 11, wherein the mirror plate further comprises a balancing layer disposed on the opposite surface of the mirror plate to the reflecting layer so as to avoid deformation of the mirror plate due to the reflecting layer.

13. The device of claim 12, wherein the balancing layer comprises a strip.

14. The device of claim 12, wherein the balancing layer comprises a frame.

15. The device of claim 12, wherein the balancing layer is a continuous film.

16. The device of claim 12, wherein the balancing layer comprises a grid.

17. The device of claim 2, wherein the mirror plate has a thickness from 0.1 to 0.45 microns.

18. The device of claim 17, wherein the thickness is from 0.2 to 0.35 microns.

19. The device of claim 2, further comprising a light absorbing material that is capable of absorbing 83% or more of the light incident thereto.

20. The device of claim 19, wherein the light absorbing material is capable of absorbing 90% or more of the light incident thereto.

21. The device of claim 19, wherein the light absorbing material is on an edge of the mirror plate.

22. The device of claim 19, wherein the light absorbing material is on a top surface of the frame, said top surface is parallel to the reflecting surface of the mirror plate.

23. The device of claim 19, wherein the light absorbing material is on a frame wall of a frame; wherein the mirror plate is held by the frame, and said frame wall being bonded to a silicon substrate having the addressing electrode formed thereon.

24. The device of claim 19, wherein the light absorbing material is on a surface of the deformable hinge.

25. The device of claim 2, wherein the hinge comprises a portion that is thinner than the mirror plate.

26. The device of claim 2, wherein the hinge comprises a mechanical enhancing layer.

27. The device of claim 26, wherein the enhancing layer comprises $SiN_x$.

28. The device of claim 27, wherein the enhancing layer comprises $SiO_x$.

29. The device of claim 27, wherein the reflecting layer is aluminum.

30. The device of claim 29, wherein the mirror plate further comprises a barrier layer between the reflecting layer and the mirror plate so as to prevent diffusion between the reflecting layer and the single crystal mirror plate.

31. The device of claim 30, wherein the reflecting layer is deposited from a sputtering target comprising Al—Si.

32. The device of claim 2, wherein the deformable hinge comprises at least a portion that is treated with thermal oxidization.

33. The device of claim 2, wherein the deformable hinge comprises at least a portion that is thermally treated with nitride.

34. The device of claim 2, further comprising:
a package substrate; and
a package cover above the package substrate so as to form a space in which the array of micromirror devices is disposed.

35. The device of claim 34, wherein the package cover is transmissive to visible light.

36. The device of claim 34, wherein the package substrate comprises a concaved surface forming a cavity in which the array of micromirror array devices is disposed; and wherein the package cover is bonded to the concaved surface so as to seal the micromirror array device between the package substrate and package cover.

37. The device of claim 36, wherein the package cover is hermetically bonded to the package substrate.

38. The device of claim 36, wherein the package cover is non-hermetically bonded to the package substrate.

39. The device of claim 36, further comprising: a getter.

40. The device of claim 2, further comprising: a lubricant for lubricating the micromirror device.

41. A projection system, comprising:
an illumination system providing illumination light;
a spatial light modulator of claim 1;
an optical element directing the illumination light onto the spatial light modulator where the illumination is modulated;
a display target on which the modulated illumination light is projected so as to produce a desired image.

42. The system of claim 41, wherein the illumination system comprises a light source, a lightpipe, and a color filter.

43. The system of claim 42, wherein the lightpipe is positioned after the light source and color filter at a propagation path of the illumination light.

44. The system of claim 42, wherein the lightpipe is positioned between the light source and color filter.

45. A spatial light modulator device, comprising:
an array of micromirror devices, each of which comprises:
a single crystal mirror plate;
a deformable hinge in the same plane of the mirror plate;
wherein the hinge is connected to the mirror plate such that the mirror plate is operable to be deflected; and
wherein the hinge comprises on a top surface of the hinge a light absorbing material that is operable to absorb 83% or more of visible light incident thereto.

46. The device of claim 45, wherein the single crystal is a single crystal silicon.

47. The device of claim 46, wherein the light absorbing material is capable of absorbing 90% or more of the visible light incident thereto.

48. The device of claim 47, wherein the light absorbing material is black nickel.

49. The device of claim 47, wherein the light absorbing material is $CrN_x$.

50. The device of claim 46, wherein the light absorbing material is black nickel, $CrN_x$, TiAlN, TaN, or a film comprising carbon.

51. The device of claim 46, wherein the hinge is thinner than the mirror plate.

52. The device of claim 46, wherein the hinge is a derived from a single crystal.

53. The device of claim 52, wherein the mirror plate and the hinge are derived from a top layer of a frame that is fabricated from the single crystal, wherein the frame comprises a frame wall.

54. The device of claim 53, wherein the mirror plate comprises a reflecting film.

55. The device of claim 54, wherein the light reflecting material is aluminum.

56. The device of claim 55, wherein the aluminum light reflecting layer is deposited from a sputtering target comprising Al—Si.

57. The device of claim 56, wherein the enhancing layer comprises $TiN_x$.

58. The device of claim 56, wherein the enhancing layer comprises $SiO_x$.

59. The device of claim 53, wherein the mirror plate further comprises a mechanical enhancing layer.

60. The device of claim 53, wherein the mirror plate further comprises a balancing layer so as to avoid deformation of the mirror plate.

61. The device of claim 45, wherein the mirror plate is held by a frame, said frame comprising a frame wall that is bonded to a silicon substrate comprising one addressing electrode for deflecting the mirror plate.

62. The device of claim 45, wherein the mirror plate further comprises a barrier layer disposed between the top surface of the mirror plate and light reflecting layer for preventing diffusion between the mirror plate and light reflecting layer.

63. The device of claim 45, further comprising another light blocking layer capable of absorbing 83% or more of the visible light incident thereto, wherein said another light blocking layer is disposed on a component of the micromirror other than the deformable hinge.

64. A spatial light modulator device, comprising:
an array of micromirror devices, each of which comprises:
a single crystal mirror plate;
a deformable hinge in the same plane of the mirror plate;
wherein the hinge is connected to the mirror plate such that the mirror plate is operable to be deflected; and
wherein the hinge comprises on a top surface of the hinge a light absorbing material with an absorpbility higher than that of the single crystal silicon.

65. The device of claim 64, wherein the single crystal is single crystal silicon.

66. The device of claim 65, wherein the light absorbing layer is capable of absorbing 83% or more of visible light incident thereto.

67. The device of claim 65, wherein the light absorbing material is capable of absorbing 90% or more of the visible light incident thereto.

68. The device of claim 65, wherein the mirror plate and deformable hinge are derived from the same single crystal.

* * * * *